United States Patent
Petrime et al.

(10) Patent No.: US 7,711,618 B2
(45) Date of Patent: May 4, 2010

(54) SYSTEM AND METHOD FOR CUSTOMIZING FINANCIAL INSTRUMENTS

(75) Inventors: Kammie Petrime, Park City, UT (US); William J. Donnelly, Salt Lake City, UT (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 378 days.

(21) Appl. No.: 11/347,491

(22) Filed: Feb. 3, 2006

(65) Prior Publication Data

US 2007/0185795 A1 Aug. 9, 2007

(51) Int. Cl.
*G06Q 40/00* (2006.01)

(52) U.S. Cl. .......................... 705/35; 239/69; 700/133; 705/27; 705/36 R; 705/37; 705/38

(58) Field of Classification Search ..................... 239/69
See application file for complete search history.

(56) References Cited

U.S. PATENT DOCUMENTS

| | | | | |
|---|---|---|---|---|
| 4,392,675 | A * | 7/1983 | Winiarski | 462/53 |
| 5,748,755 | A * | 5/1998 | Johnson et al. | 382/115 |
| 5,765,874 | A * | 6/1998 | Chanenson et al. | 283/67 |
| 5,963,953 | A * | 10/1999 | Cram et al. | 707/102 |
| 5,999,908 | A * | 12/1999 | Abelow | 705/1 |
| 6,085,165 | A * | 7/2000 | Ulwick | 705/7 |
| 6,349,290 | B1 * | 2/2002 | Horowitz et al. | 705/35 |
| 6,414,693 | B1 * | 7/2002 | Berger et al. | 345/641 |
| 6,493,677 | B1 * | 12/2002 | von Rosen et al. | 705/27 |
| 6,606,606 | B2 * | 8/2003 | Starr | 705/36 R |
| 6,705,218 | B2 * | 3/2004 | Rapp | 101/35 |
| 6,772,136 | B2 | 8/2004 | Kant et al. | |
| 6,782,418 | B1 * | 8/2004 | Cerrone et al. | 709/217 |
| 6,810,401 | B1 * | 10/2004 | Thompson et al. | 707/101 |
| 6,845,365 | B2 * | 1/2005 | von Rosen et al. | 705/27 |
| 6,877,656 | B1 * | 4/2005 | Jaros et al. | 235/380 |
| 6,901,378 | B1 * | 5/2005 | Linker et al. | 705/27 |
| 7,216,092 | B1 * | 5/2007 | Weber et al. | 705/26 |
| 7,233,885 | B1 * | 6/2007 | Larabee et al. | 703/1 |
| 7,260,445 | B2 * | 8/2007 | Weiser et al. | 700/133 |
| 7,437,024 | B2 * | 10/2008 | Baum et al. | 382/311 |
| 2002/0099524 | A1 * | 7/2002 | Sell et al. | 703/1 |
| 2002/0169882 | A1 * | 11/2002 | Fayemi | 709/229 |
| 2003/0139840 | A1 * | 7/2003 | Magee et al. | 700/133 |

(Continued)

OTHER PUBLICATIONS

Fabrizio Salvador, Pablo Martin De Holan and Frank Piller, Innovation Strategy: How to make mass customization work, Innovation Tools, Jun. 2009, www.innovationtools.com/Articles/EnterpriseDetails.asp?a=438 (MinCust).*

(Continued)

*Primary Examiner*—James P Trammell
*Assistant Examiner*—Chika Ojiaku
(74) *Attorney, Agent, or Firm*—Crowell & Moring LLP

(57) ABSTRACT

A graphical user interface of a product configurator is accessible by user computers over a network. In one embodiment, the product configurator presents a plurality of product-based customization options from which a user may select. In response to such options, a user may provide product-based customization information to the product configurator. This information is usable to generate a product-based customized image that may be imprinted across the face of a financial instrument.

26 Claims, 5 Drawing Sheets

U.S. PATENT DOCUMENTS

2004/0143526 A1* 7/2004 Monasterio et al. ............ 705/35
2005/0116027 A1* 6/2005 Algiene et al. ............... 235/380
2005/0167487 A1* 8/2005 Conlon et al. ............... 235/380
2005/0251553 A1* 11/2005 Gottfried ................... 709/204
2007/0112460 A1* 5/2007 Kiselik ....................... 700/233

OTHER PUBLICATIONS

Arun Nambiar, Mass Customization, World Congress of Engineering vol. 1 2009(Custom).*

* cited by examiner

SYSTEM AND METHOD FOR CUSTOMIZING FINANCIAL INSTRUMENTS

FIELD OF THE INVENTION

The present invention relates, in general, to financial instruments such as credit cards and, more particularly, to customized financial instruments using an online product configurator.

BACKGROUND OF THE INVENTION

Product manufacturers must be able to control the images that are used to portray their products in order to protect their brand. In particular, companies must be able to ensure sufficient resolution and image clarity, prevent the introduction of copyrighted or inappropriate content, and ensure that their products are displayed in a manner which does not tarnish or otherwise dilute the company's image. As such, true product-based personalization of credit cards has not been feasible due to the perceived inability to control the type and quality of the personalization.

Some credit card issuers have offered their customers a "photo card" which is essentially a regular credit card with a one-inch square box onto which a customer-supplied photo is printed. Users can submit their personal photos by either stopping into an approved banking center or by mailing in the picture along with a request form. This approach is offered as a fraud protection tool rather than a personalization tool and is obviously not product-based. The aforementioned issues regarding image control are not a concern in this case since the goal is merely accurate customer identification, and not product image.

Other credit card issuers have offered credit card users the limited customization option of being able to select from among certain approved static images to be displayed on the face of the credit card. Examples of such images include favorite sports teams and universities, which tend to invoke a sense of pride or accomplishment for the customer. However, such static images are only generic impersonalized company-approved images. They are not truly customized images in the sense that they are created using customer-specific information, nor are they product-based images. And unlike the photo card example mentioned above, credit card issuers will not allow their customers to simply submit pictures of their automobiles or other purchased products for imprinting on the face of their credit cards. Such a practice would compromise the product manufacturers' ability to carefully control the manner in which their products are presented to the public.

As with universities and sports teams, certain consumer products tend to invoke a sense of pride or accomplishment for the customer. Automobiles are one such example. However, since credit card issuers will not accept photographs of their customer's specific products (e.g., automobile), as they would for the photo card discussed above, there is currently no way for customers to truly customize their credit cards with an image reflecting the specific characteristics of their purchased product. Accordingly, there is a need in the art for enabling the product-based personalization of financial instruments such as credit cards.

BRIEF SUMMARY OF THE INVENTION

Systems and methods for customizing financial instruments are disclosed. In one embodiment, a method includes providing a graphical user interface of a product configurator that is accessible over a network, receiving product-based customization information from a user of the product configurator, and generating an image based on the product-based customization information. The method further includes generating a financial instrument using the image and account information for the user, where the image and account information are to appear on the face of the financial instrument.

Other aspects, features, and techniques of the invention will be apparent to one skilled in the relevant art in view of the following detailed description of the invention.

DETAILED DESCRIPTION OF EXEMPLARY EMBODIMENTS

Figure 1:
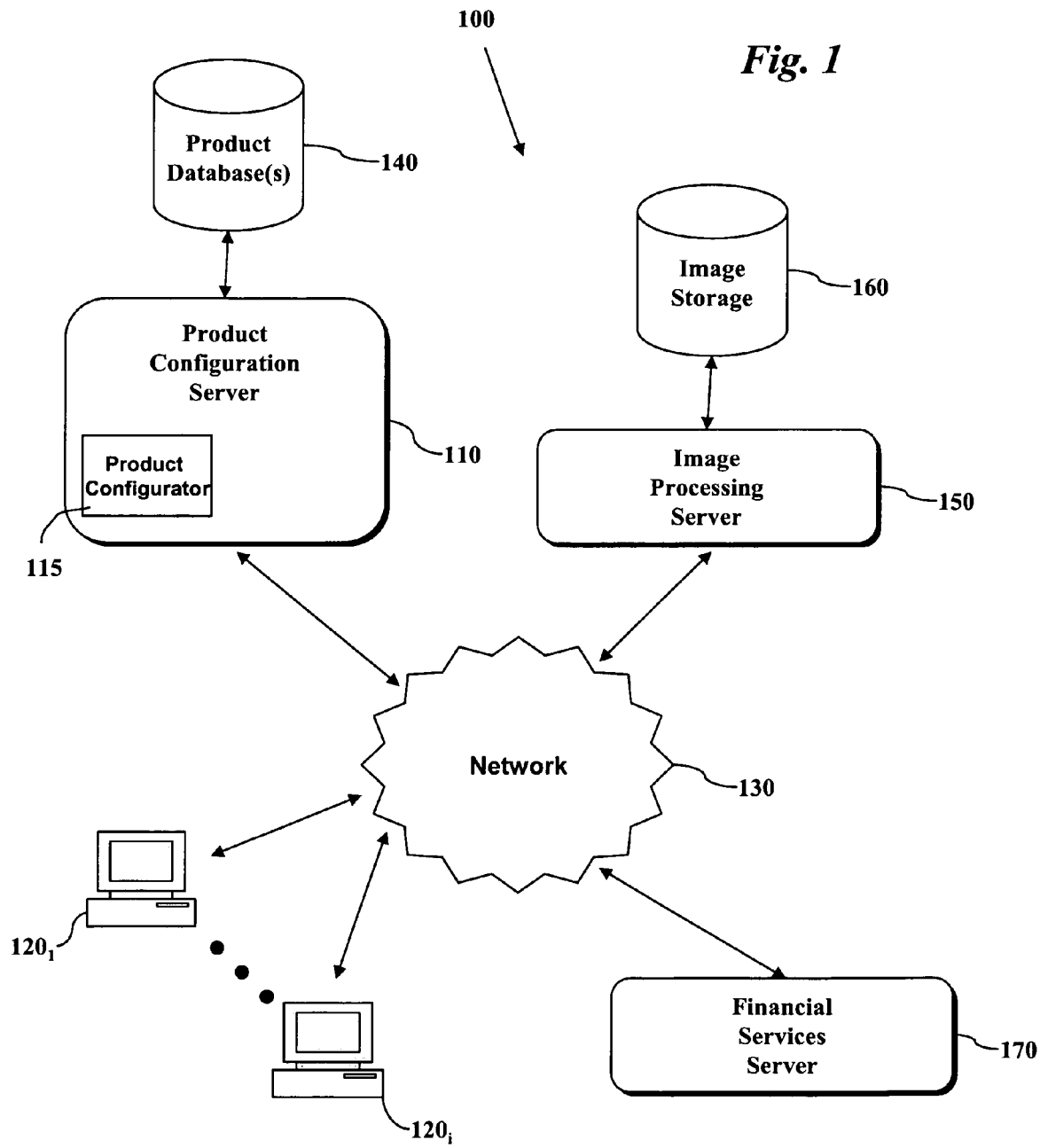
FIG. 1 depicts one embodiment of a simplified system diagram showing the network connectivity between one or more elements of the invention.

One aspect of the invention is to provide access to a graphical user interface of a product configurator over a network. In one embodiment, the graphical user interface of the product configurator may present a plurality of product-based customization options to a user. In response, the user may provide product-based customization information to the product configurator over the network. In certain embodiments, the product configurator is also usable to configure a product to be purchased online. In one embodiment, the product configurator is a vehicle configurator.

Based on the provided product-based customization information, a customized product image may be generated. This image may then be used in the generation of a financial instrument, wherein the image and user account information appear on a face of the financial instrument. In one embodiment, the image may be imprinted across at least 50% of the face of the financial instrument. In another embodiment, the image may be imprinted from edge-to-edge across the face of the financial instrument.

Another aspect of the invention is for a financial services server to receive online application information from a user looking to obtain approval for a financial instrument. The aforementioned customized product image may be accessed by the financial services server and associated with an applicant identifier, such as an application or account number.

Still another aspect of the invention is to enable a user to be able to automatically populate the product configurator by merely providing it with a unique product number corresponding to a specific purchased product. In the embodiment where the product configurator is a vehicle configurator, this unique product number may be a vehicle identification number or a vehicle production number.

When implemented in software, the elements of the invention are essentially the code segments to perform the necessary tasks. The program or code segments can be stored in a processor readable medium or transmitted by a computer data signal embodied in a carrier wave over a transmission medium or communication link. As discussed herein, a "computer" or "computer system" is a product including circuitry capable of processing data. The computer system may include, but is not limited to, general purpose computer systems (e.g., server, laptop, desktop, palmtop, personal electronic devices, etc.), personal computers (PCs), hard copy equipment (e.g., printer, plotter, fax machine, etc.), banking equipment (e.g., an automated teller machine), and the like. In addition, a "communication link" refers to the medium or channel of communication. The communication link may include, but is not limited to, a telephone line, a modem connection, an Internet connection, a digital subscriber line (DSL), an Integrated Services Digital Network ("ISDN") connection, an Asynchronous Transfer Mode (ATM) connection, a frame relay connection, an Ethernet connection, a coaxial connection, a fiber optic connection, satellite connections (e.g. Digital Satellite Services, etc.), wireless connections, radio frequency (RF) links, electromagnetic links, two way paging connections, etc., and combinations thereof.

Figure 2A:
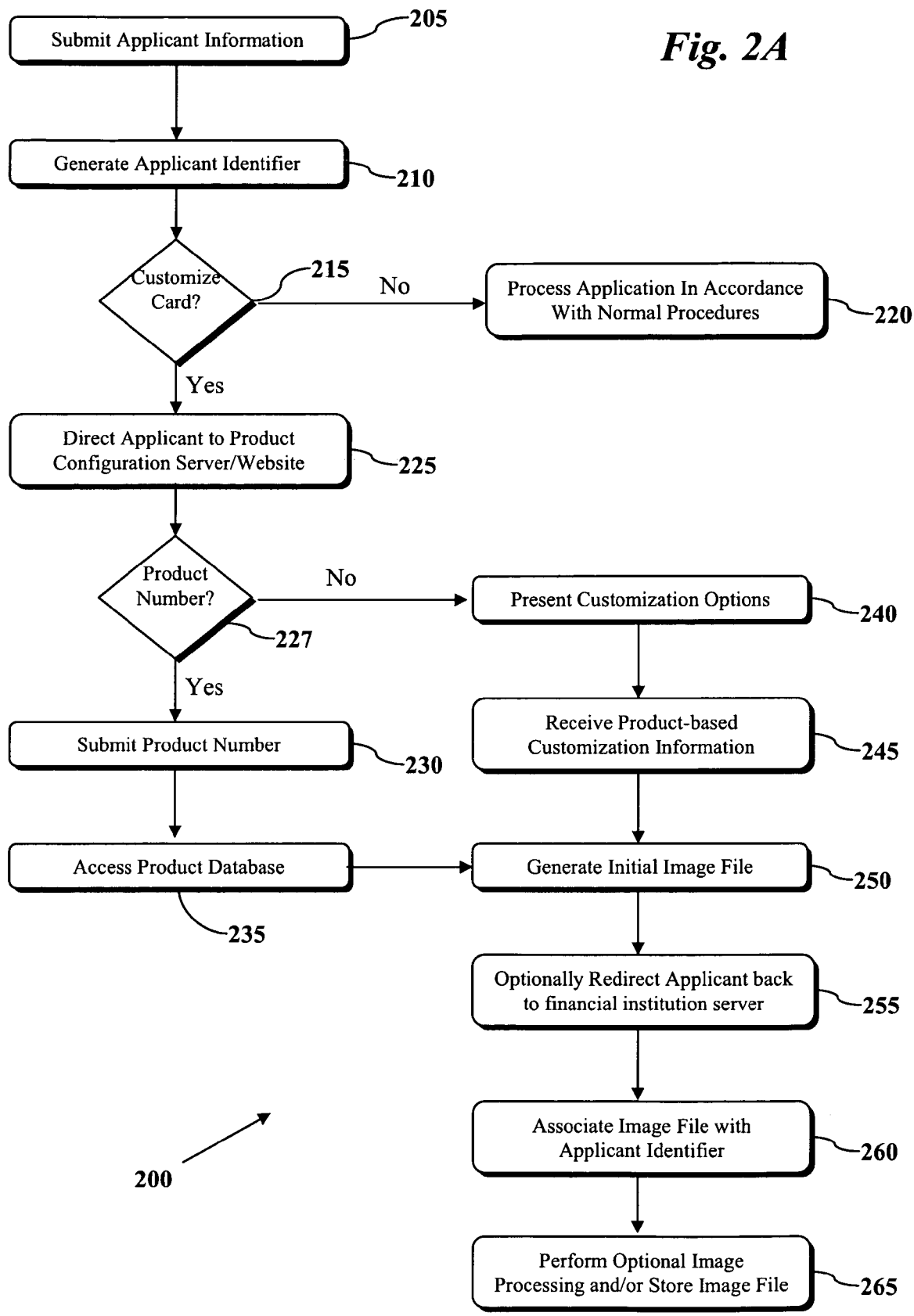
FIGS. 2A-2B depicts one embodiment of a process for carrying out one or more aspects of the invention.

Referring now to the figures, FIG. 1 depicts an exemplary embodiment of a network system 100 for carrying out one or more aspects of the invention. In this embodiment, the product configuration server 110 is accessible by a number of user computers $120_1$-$120_i$ ("120") via a communication link with network 130. Network 130 may include any variety of computer networks such as the Internet, a private intranet, a public switch telephone network (PSTN), or any other type of network known in the art. As will be described in more detail below with reference to FIGS. 2A-3, users may access the product configuration server 110 in order to customize financial instruments, such as credit cards, using particular characteristics of their desired or purchased products (e.g., automobiles).

The product configuration server 110 may comprise one or more computer systems that execute one or more software modules for performing the configuration functions of the invention. In one embodiment, one of these modules is a product configurator module, depicted in FIG. 1 as product configurator 115. Additional modules may include software for generating one or more websites, or network resources, that provide access to the product configurator via network 130. To that end, user computers 120 may access the product configuration server 110 by causing a browser application (e.g., Netscape Navigator™, Microsoft Internet Explorer™, etc.) to be directed to a network address (e.g., URL) corresponding to the product configurator 115 module of the product configuration server 110. It should equally be appreciated that numerous other network configurations may be used which provide user-level access to the configuration functions performed by the product configuration server 110, as detailed further below.

The product configuration server 110 may further be in communication with one or more product databases 140. In one embodiment, the product databases 140 contain product data usable to populate the possible configuration options that are presented to users via one or more graphical user interfaces (GUIs) of the product configurator. While in certain embodiments the product database(s) 140 may be local to the product configuration server 110, in other embodiments it may be remotely located and maintained, such as by the product manufacturer itself.

Similarly, the product configuration server 110 itself may be local to and maintained by a manufacturer of associated product(s), or alternatively it may be maintained remotely from the product manufacturer. Moreover, the aforementioned product configurator 115 and the product configuration server 110 may be configured to perform the financial instrument customization functions of the invention, as well as usable to customize product options for a prospective online product purchase.

Continuing to refer to FIG. 1, image processing server 150 is further depicted as being in communication with network 130 via a communication link. In certain embodiments, the image processing server 150 receives information (e.g., an image file) from the product configuration server 110 representative of a customized product image usable to customize one or more financial instruments in accordance with the principles of the invention. The image processing server 150 may be used to further process and format the received product image—the revised image file being storable by image storage 160. While in one embodiment, the image processing server 150 is a stand-alone computer system, in another embodiment it may be integrated into the product configuration server 110.

A formatted customized product image file, whether processed remotely by the image processing server 150 or not, may be accessed and downloaded by financial services server 170 via network 130. As will be described in more detail below, the financial services server 170 may associate a customized product image file with a financial instrument application or existing account. In certain embodiments, the financial services server may be maintained by the financial institution that is to issue the financial instrument.

While product configuration server 110, image processing server 150 and financial services server 170 have been depicted in FIG. 1 as three separate and distinct systems, it should equally be appreciated that the operations carried out by each may be integrated into and carried out by any number of servers.

FIG. 2 depicts one embodiment of a process 200 for performing product-based customization of a credit card by a credit card applicant in accordance with the principles of the invention. While process 200 is described in terms of credit cards, it should similarly be appreciated that other forms of financial instruments (e.g., charge cards, debit cards, etc.) may similarly be customized using the process described herein.

Process 200 begins at block 205 with the applicant providing the typical application information required by an issuing financial institution to determine if the applicant is qualified to receive a new credit card. Such information may include the applicant's name, social security number, address, occupation, etc. In one embodiment, this application information may be provided online using a user computer (e.g., user computer 120) which can access a website of the issuing financial institution. In one embodiment, this website may be generated by the financial services server 170 of FIG. 1.

Thereafter, at block 210, an applicant identifier may be generated and associated with the received application information from block 205. The applicant identifier may simply be an application number, for example. The applicant may then be given the option at block 215 of customizing their new credit card pending the approval of the application. If the applicant chooses not to customize the card, process 200 will move to block 220 where the application will be processed in accordance with the typical procedures adopted by the issuing institution. If, on the other hand, the applicant has indicated at block 215 that they would like to have their new credit card be a product-based customized card, then process 200 will continue to block 225. It should equally be appreciated that the applicant may be given other options for customization along with the product-based customization option (e.g., choice of static images). In addition, the user may be given multiple customization choices based on different products (e.g., different models of automobiles).

At block 225, the applicant may be directed to a product configuration server/website associated with a particular product. In one embodiment, this may entail directing a browser application of the applicant's computer to access a product configurator software module (e.g., product configurator 115) that is being executed on the product configuration server, such as the previously-described server 110. Alternatively, the applicant may be directed to a portal from which several product configurators may be accessed based on, for example, which product the applicant would like to use in the customization process.

Once the applicant has been directed to the desired product configurator, process 200 continues to block 227 where the applicant may be provided with the option to enter a unique product number identifying a desired or already-purchased product. For example, in the case of an automobile configurator, the product number may consist of a vehicle identification number (VIN) or an automobile production number. If the applicant indicates that it has a product number, then process 200 will continue to block 230 where the applicant will be prompted by a graphical user interface to enter the unique product number (e.g., VIN). At this point, a product database may be accessed using the provided product number (block 235). In one embodiment, the product database contains product-specific information that can be referenced with a product number. For example, where the product number is a VIN, the product database may be a vehicle manufacturer's database containing detailed information regarding the vehicle that was manufactured with the provided VIN.

Once the product information relating to the applicant's product has been accessed, process 200 may continue to block 250 where an initial version of the customized image file may be generated. In one embodiment, the product information obtained at block 235 may be used to populate the product configurator of the product configuration server. The product-based customized image may also be presented to the applicant for approval. In another embodiment, the product-based customized image may be graphically displayed in the same manner as it would appear on the credit card. Namely, a GUI may be presented to the applicant with the customized image embossed from edge-to-edge across the surface of a sample credit card with sample account information imprinted thereon (see e.g., FIG. 4 below).

If, on the other hand, the applicant indicates at block 227 that it does not have a product number, then process 200 may continue to block 240 where the product configurator may present the applicant with the various customization options available for the product in question. Assuming the product is an automobile, some of the potential customization options may include:

Model Year—may display and allow selection of all manufactured model years, or only certain years;
Model—may allow selection of all manufactured model styles based on model year selected;
Color—may allow selection of all manufactured colors based on the model and year selected;
Packages—may allow selection of all packages offered based on the year and model selected;
Wheels—may allow selection of all wheel styles offered based on the year and model selected;
Interior/Cockpit styling—may allow selection of the interior colors/styles where the interior of vehicle is to be visible on the customized credit card;
Exterior Styling—may allow selection of all available exterior styling items based on the year and model selected;
Etc.

It should of course be understood that the number and type of possible customization options are virtually infinite and will depend at least in part on the product chosen. Based on the available product customization options, the applicant will be able to provide applicant-specific customization information (block 245). In one embodiment, customization information may be provided by selecting from among various customization options presented in a drop down window of a graphical user interface of the product configurator. Moreover, the product configurator website may be designed to serve the dual function of being usable to perform the financial instrument customization functions of the invention, as well as usable to customize product options for a prospective product purchase.

Once all of the customization information has been received, process 200 may continue to block 250 where an initial version of the customized image file may be generated and possibly presented to the applicant for approval in the same manner as described above.

At this point, the user may or may not be redirected back to the financial institution server (block 255). Regardless, the image file may then be associated with the previously-generated applicant identifier in block 250. In one embodiment, this may be accomplished by associated an image file number with an applicant number at block 260. While in one embodiment, this association is done by the financial institution server, it may also be performed by the product configuration server where the applicant identifier was passed to the product configuration server, such as when the applicant was directed thereto.

In any case, the image may be further processed and/or stored for later use at block 265. For example, it may be necessary to improve or otherwise alter the resolution and/or orientation of the initial image file of block 250. Image processing may be performed by an image processing server (e.g., image processing sever 150) and stored in an image database (e.g., image storage 160) for use if and when the application is approved. As previously mentioned, the image processing and/or storage may be carried out in a stand-alone image processing server/database to which the image file is passed, or alternatively as part of the function of the product configuration server.

Figure 2B:
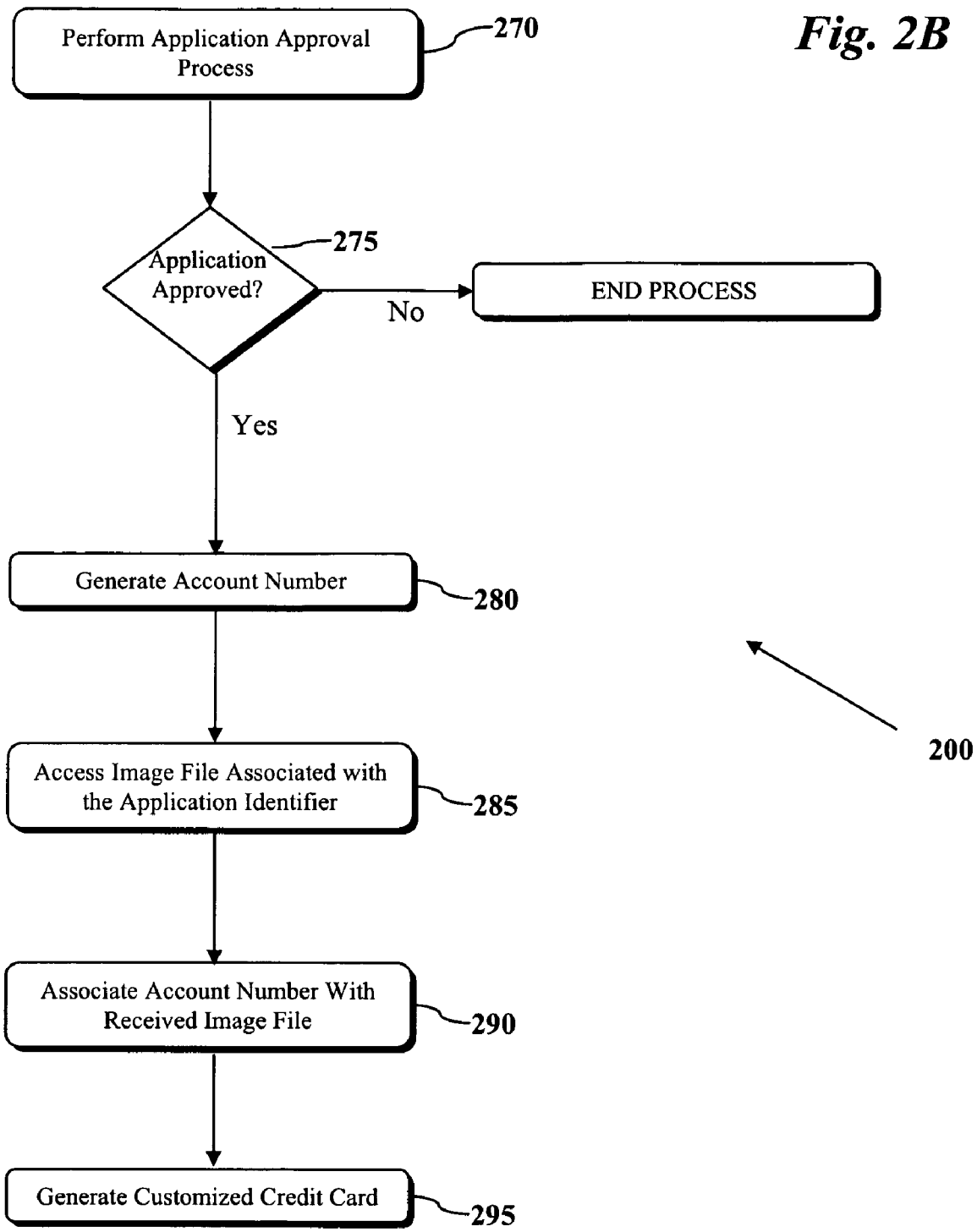

Referring now to FIG. 2B, process 200 continues to block 270 where the application approval process may be performed. In one embodiment, this function may be carried out by the financial institution server, or otherwise by the issuing institution. If a determination is made at block 275 that the application is not approved, process 200 will end without the generation of a product-based credit card. If, on the other hand, the application is approved, process 200 will continue to block 280 where an account number and other associated account information for the applicant may be generated (e.g., card expiration date, CVV code, etc.).

At this point in the process, the credit card itself may be created. In order to do this, the customized image file previously generated and stored must be accessed (block 285). As previously mentioned, the image file may be stored remotely from the financial institution, such as by the image processing server/database. Once the financial institution has accessed or obtained the image file, the image file may be associated with the newly generated account number at block 290. Assuming that all requisite image processing has been completed, the actual physical plastic credit card may then be generated at block 295 using the account information (e.g., account number, expiration date, etc.).

As previously mentioned, one aspect of the invention is to provide edge-to-edge product-based customization of financial instruments. To that end, the credit card generated at block 295 may be imprinted with an edge-to-edge image. In one embodiment, this plastic card imprinting process may be carried out using the Artista® custom card printer manufactured and sold by Datacard Group of Minnetonka, Minn. In another embodiment, the image may be embossed across the majority of the face of the generated card surrounded, for example, by a border of any kind. Such an image may be centered or positioned in varying locations on the front of the financial instrument.

Figure 3:
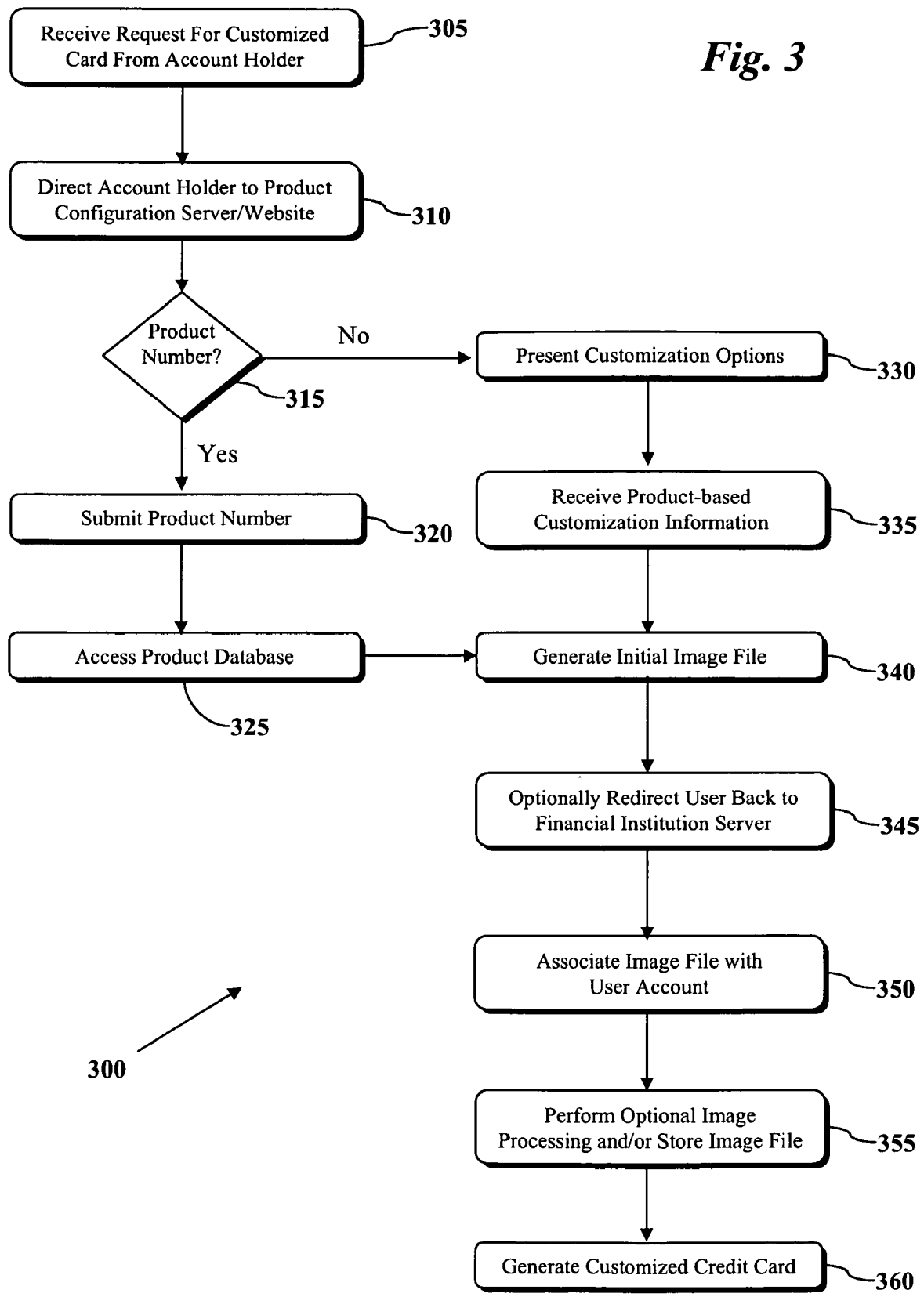
FIG. 3 depicts another embodiment of a process for carrying out one or more aspects of the invention.

FIG. 3 depicts one embodiment of a process 300 for performing product-based customization of a credit card by an existing account holder. While process 300 is described in terms of credit cards, it should similarly be appreciated that other forms of financial instruments (e.g., charge cards, debit cards, etc.) may similarly be customized using the process described herein.

Process 300 begins at block 305 with the account holder requesting that they be provided with a product-based customized credit card, such as a replacement card. In one embodiment, this user request may be initiated by having the account holder access a website of the issuing institution (e.g., financial services server 170). The account holder may also be given other options for customization along with the product-based customization option (e.g., choice of static images). In addition, the user may be given multiple customization choices based on different products (e.g., different models of automobiles).

Once the account holder has determined which product it will use to customize the new credit card, the account holder may be directed to a product configuration server/website associated with the particular product at block 310. In one embodiment, this may entail directing a browser application of the account holder's computer to access a product configurator (e.g., configurator 115) of a product configuration server, such as the previously-described server 110. Alternatively, the account holder may be directed to a portal from which several product configuration servers may then be accessed based on, for example, which product the account holder would like to use in the customization process.

Once the account holder has been directed to the desired product configuration server, process 300 continues to block 315 where the account holder may be provided with the option to enter a unique product number identifying a desired or already-purchased product. As with process 200 described above, in the case of an vehicle configurator, the product number may be a vehicle identification number (VIN) or an automobile production number. If the account holder indicates that there is a product number, then process 300 will continue to block 320 where the account holder will be prompted by a graphical user interface to enter the unique product number (e.g., VIN). At this point, a product database may be accessed using the provided product number (block 325). In one embodiment, the product database contains product-specific information that can be referenced with a product number. For example, where the product number is a VIN, the product database may be a vehicle manufacturers database containing detailed information regarding the type of vehicle corresponding to the entered VIN.

Once the product information relating to the account holder's product has been accessed, process 300 may continue to block 340 where an initial version of the customized image file may be generated. In one embodiment, this is done by having the product information obtained at block 325 populate the product configurator of the product configuration server. The product-based customized image may also be presented to the applicant for approval. In another embodiment, the product-based customized image may be graphically displayed in the same manner as it would appear on the credit card. Namely, a GUI may be presented to the applicant with the customized image embossed from edge-to-edge across the surface of a sample credit card with sample account information imprinted thereon (see e.g., FIG. 4 below).

If, on the other hand, the account holder indicates at block 315 that there is no available product number, process 300 may then continue to block 330 where various customization options may be presented to the account holder. As with the process 200 of FIG. 2, it should be understood that the number and type of possible customization options are virtually infinite and will depend on the product chosen.

Based on the available product customization options, the account holder will be able to provide user-specific customization information at block 335. In one embodiment, the customization information may be provided by selecting from among various customization options presented in drop down windows of a graphical user interface of a product configurator. Moreover, the product configurator website may be designed to serve the dual function of being usable to perform the financial instrument customization functions of the invention, as well as usable to customize product options for a prospective product purchase.

Once all of the customization information has been received, process 300 may continue to block 340 where an initial version of the customized image file may be generated. As mentioned above, the product-based customized image may also be presented to the applicant for approval. In another embodiment, the product-based customized image may be graphically displayed in the same manner as it would appear on the credit card with the customized image embossed from edge-to-edge across the surface of a sample credit card with sample account information imprinted thereon.

At this point, the account holder may or may not be redirected back to the financial institution server (block 345). Regardless, the image file may be associated with the an account identifier at block 350. In one embodiment, this may be accomplished by associated an image file number with an account number. While in one embodiment, this association is done by the financial institution server, it may also be performed by the product configuration server where the account identifier was passed to the product configuration server when the account holder was directed thereto.

In any case, the image may be further processed and/or stored for later use at block 355. For example, it may be necessary to improve or otherwise alter the resolution and/or orientation of the initial image file of block 340. Image processing may be performed by an image processing server (e.g., image processing sever 150) and stored in an image database (e.g., in image storage 160) for use if and when the application is approved. As previously mentioned, the image processing and/or storage may be carried out in a stand-alone image processing server/database to which the image file is passed, or alternatively as part of the function of the product configuration server.

At this point in the process 300, the new credit card itself is generated. As previously mentioned, the image file may be stored remotely from the financial institution, such as by the image processing server/database. Regardless of how the image file is stored or otherwise maintained during the customization process, the actual physical plastic credit card may then be generated at block 360 using the account information (e.g., account number, expiration date, etc.) and the generated image file. In one embodiment, the credit card generated at block 360 may be imprinted with an edge-to-edge image using a custom card printer, such as the Artista® printer manufactured and sold by Datacard Group of Minnetonka, Minn. In another embodiment, the image may be embossed across the majority of the face of the generated card surrounded, for example, by a border of any kind. Such an image may be centered or positioned in varying locations on the front of the financial instrument.

While the aforementioned processed have been described in the above embodiments, it should be appreciated that these are for exemplary value only and other embodiments are applicable to the invention. For example, the order of the blocks constituting process 200 and process 300 may vary. For the sake of simplicity, these processes have been defined in general steps and it should be appreciated that other steps consistent with the principles of the invention may be included.

Figure 4:
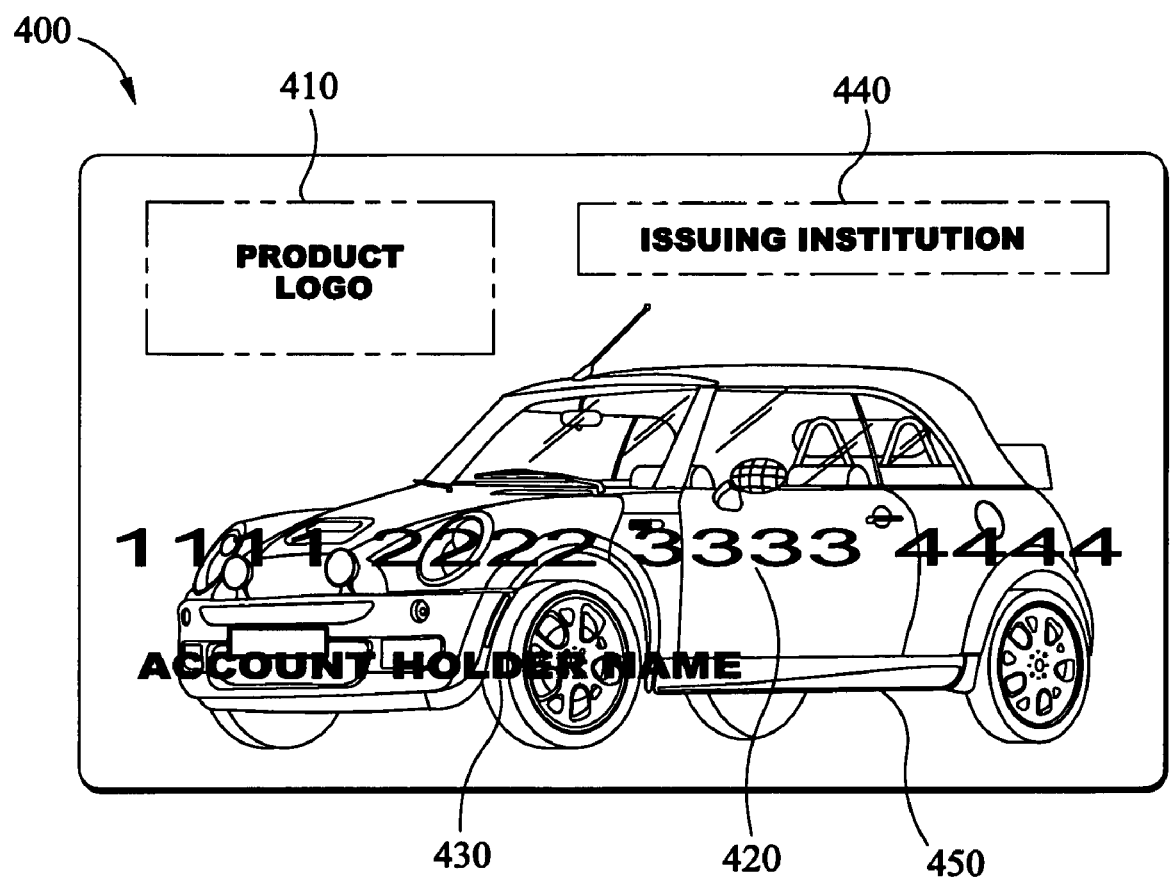
FIG. 4 illustrates one embodiment of a product-based customized financial instrument, generated in accordance with the principles of the invention.

FIG. 4 depicts one embodiment of how a credit card generated in accordance with either process 200 or process 300 may look. In this embodiment, credit card 400 is depicted as comprising a product logo element 410 and an issuing institution element 440. In one embodiment, the product logo element 410 may be a trademark or other identifying mark for the specific product that was used to customize the card 400 using one of process 200 or process 300.

As show in FIG. 4, an account number 420 and account holder name 430 may also appear on the face of the card. Finally, the product-based customized image 450 in the background is shown as being an edge-to-edge image embossed across the face of the credit card 400. It should equally be appreciated that one or more of the elements shown in FIG. 4 may be omitted and still be consistent with the principles of the invention.

While the invention has been described in connection with various embodiments, it should be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method comprising the acts of:
 receiving, by a financial services server, a request from an applicant to apply a customized image of a product onto a surface of a financial instrument for which said applicant is applying online;
 directing, by the financial services server and in response to the request, the applicant to a graphical user interface of a product configurator that is accessible over a network;
 generating, by the product configurator, a customized image of the product based only on product-based customization options provided by said applicant to the product configurator and on image data provided by a manufacturer of the product;
 receiving, by the financial services server, an image file over the network from the product configurator that contains the customized image; and
 generating the financial instrument using said image file and account information for said applicant by applying said customized image and account information on a face of said financial instrument.

2. The method of claim 1, further comprising the acts of:
 associating said customized image with an applicant identifier for said applicant; and
 approving, prior to said generating the financial instrument, said applicant to obtain said financial instrument based on application information provided by said applicant.

3. The method of claim 1, wherein said receiving the request comprises receiving a request from an existing account holder to customize a replacement financial instrument based on a purchased product.

4. The method of claim 3, wherein said purchased product is a vehicle.

5. The method of claim 1, wherein said product-based customization information comprises a unique product number corresponding to a specific purchased product.

6. The method of claim 1, wherein said image file is to be associated with an identifier for said applicant.

7. The method of claim 1, wherein said financial instrument is selected from the group consisting of credit cards, charge cards and debit cards.

8. The method of claim 1, further comprising accessing the image file that contains said customized image from an image processing server.

9. The method of claim 1, wherein generating the financial instrument further comprises imprinting said customized image across at least 50% of the face of said financial instrument.

10. The method of claim 1, wherein generating the financial instrument further comprises imprinting said customized image from edge-to-edge across the face of said financial instrument.

11. The method of claim 1, wherein the product configurator is maintained by the manufacturer of the product.

12. The method of claim 1, wherein the financial services server is operated by a financial services institution.

13. The method of claim 12, wherein the product is manufactured by a third-party manufacturer unrelated to the financial services institution.

14. A system for customizing a financial instrument comprising:
 a user computer coupled to a network and associated with an online applicant of the financial instrument;
 a financial services server coupled to the network to:
  receive a request from the online applicant via the user computer to apply a customized image of a product onto a surface of the financial instrument, and
  direct, in response to the request, the online applicant to a graphical user interface of a product configuration server that is accessible over a network; and
 the product configuration server coupled to said network and accessible by said user computer, wherein said product configuration server is to,
  execute a product configurator module that is accessible by said user computer over the network,
  receive product-based customization options from said user computer;
  generate a customized image of the product based only on said product-based customization options and on image data provided by a manufacturer of the product, and
  provide an image file containing said customized image to the financial services server over the network, where said customized image is to be imprinted on a face of the financial instrument.

15. The system of claim 14, wherein said product configurator is a software module executing on said product configuration server that present a plurality of product-based customization options to the user computer.

16. The system of claim 14, wherein the financial services server is further to,
 receive application information corresponding to the online applicant;
 associate the image file with an applicant identifier; and
 approve said online applicant to obtain the financial instrument based on said application information; and generate the financial instrument with said customized image imprinted on the face from edge-to-edge.

17. The system of claim 14, wherein said product configurator is further usable to configure products to be purchased online.

18. The system of claim 14, wherein said product configurator is a vehicle configurator.

19. The system of claim 14, wherein said product-based customization information is a unique product number corresponding to a specific purchased product.

20. The system of claim 19, wherein said unique product number is one of a vehicle identification number and a vehicle production number.

21. The system of claim 14, wherein said financial instrument is selected from the group consisting of credit cards, charge cards and debit cards.

22. The system of claim 14, wherein said customized image is to be imprinted across at least 50% of the face of said financial instrument.

23. The system of claim 14, wherein said customized image is to be imprinted from edge-to-edge across the face of said financial instrument.

24. The system of claim 14, wherein the product configuration server is maintained by the manufacturer of the product.

25. The system of claim 14, wherein the product is manufactured by a third-party manufacturer unrelated to the financial services institution.

26. The system of claim 25, wherein the product is manufactured by a third-party manufacturer unrelated to the financial services institution.

* * * * *